United States Patent
Venkata Naga Ravi

(10) Patent No.: US 10,558,861 B2
(45) Date of Patent: Feb. 11, 2020

(54) SUPPLEMENTING A MEDIA STREAM WITH ADDITIONAL INFORMATION

(71) Applicant: Oracle International Corporation, Redwood Shores, CA (US)

(72) Inventor: Kiran Vedula Venkata Naga Ravi, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 181 days.

(21) Appl. No.: 15/667,434

(22) Filed: Aug. 2, 2017

(65) Prior Publication Data

US 2019/0042852 A1 Feb. 7, 2019

(51) Int. Cl.
*G06F 17/24* (2006.01)
*G06K 9/00* (2006.01)
*G06F 3/14* (2006.01)

(52) U.S. Cl.
CPC ..... *G06K 9/00744* (2013.01); *G06K 9/00718* (2013.01); *G06F 3/1454* (2013.01); *G06F 17/243* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,107,443 | A * | 4/1992 | Smith | | G06Q 10/10 713/166 |
| 7,680,324 | B2 * | 3/2010 | Boncyk | | G06Q 20/10 382/165 |
| 7,827,312 | B2 * | 11/2010 | Ramaswamy | | H04H 20/95 709/246 |
| 7,953,219 | B2 * | 5/2011 | Freedman | | G06Q 30/02 379/265.06 |
| 8,812,510 | B2 * | 8/2014 | Romanov | | G11B 27/034 707/746 |
| 9,105,011 | B2 * | 8/2015 | Calman | | G06Q 30/0633 |
| 9,852,188 | B2 * | 12/2017 | Bakir | | G06F 16/24575 |
| 10,068,381 | B2 * | 9/2018 | Blanchflower | | G06T 15/20 |
| 2008/0046919 | A1 * | 2/2008 | Carmi | | H04N 7/10 725/32 |
| 2009/0292541 | A1 * | 11/2009 | Daya | | G10L 15/063 704/251 |
| 2010/0131868 | A1 * | 5/2010 | Chawla | | G06F 3/044 715/759 |

(Continued)

*Primary Examiner* — Tsung Yin Tsai
(74) *Attorney, Agent, or Firm* — Invoke

(57) ABSTRACT

Operations include extracting and presenting data associated with a media stream being transmitted from a source device to a target device. The media stream may include a stream of video frames displayed by the source device. A screen sharing application, executing on the source device, may capture the stream of video frames. The screen sharing application may transmit the stream of video frames to a target application executing on a target device. The target device (or an intermediate device) analyzes the media stream, as the media stream is received from the source device. The target device may execute pattern matching to extract information, including text, images, and audio clips from the media stream. The target device may present the extracted information or use the extracted information to perform tasks, such as filling in a form.

20 Claims, 9 Drawing Sheets

(56) References Cited

U.S. PATENT DOCUMENTS

| | | | |
|---|---|---|---|
| 2011/0043652 A1* | 2/2011 | King | G06F 17/2211 348/222.1 |
| 2011/0154219 A1* | 6/2011 | Khalatian | G06F 3/1462 715/751 |
| 2011/0206198 A1* | 8/2011 | Freedman | G06Q 30/06 379/265.03 |
| 2011/0252311 A1* | 10/2011 | Kay | G06F 17/243 715/255 |
| 2013/0007298 A1* | 1/2013 | Ramaswamy | H04L 65/607 709/231 |
| 2013/0212466 A1* | 8/2013 | Khalatian | G06Q 50/01 715/234 |
| 2015/0244814 A1* | 8/2015 | Khalatian | H04L 67/141 715/753 |
| 2015/0319510 A1* | 11/2015 | Ould Dellahy, VIII | H04N 21/234 725/32 |
| 2016/0057490 A1* | 2/2016 | Besehanic | H04N 21/44213 725/19 |

* cited by examiner

Claim for John Doe

Back to Previous Page

Understanding This Page (pdf)   Ask a Question

Visited   L. Skywalker   Status   Processed 12/08/2016
Date(s) of Service 12/05/2016   Date Received 12/05/2016
Claim Number   1234252566

Explanation of Benefits (PDF)

Manage This Claim
☑ Watch This Claim   ☑ Mark as Paid   📝 Add Note

402

At a Glance       Amount Billed $360.00

Plan Discounts        $0.00
Your Plan Paid        $182.00
Your Responsibility   $78.00
Coinsurance           $78.00

Your Responsibility   $78.00
You May Owe           $78.00
Payment Help   (Make Payment)

| Claim ID | Item Code | Plan Cost | Explanation |
|---|---|---|---|
| 1234252566 | B-124 | 100 | |
| 1234252566 | AC-15U1 | 100 | |
| 1234252566 | P-15561 | 60 | |
| 1234252566 | P-1561 | NC | Invalid Code |
| 1234252566 | P-15269 | NC | Invalid Code |

Issue Summary: Incorrect Coverage

Claim for John Doe
Back to Previous
Understanding This Page (pdf) Ask a Question
Visited    L. Skywalker  Status    Processed 12/08/2016
Date(s) of Service 12/05/2016  Date  Received  12/05/2016
Claim Number 1234252566
Explanation of Benefits (PDF)

Manage This Claim
Watch This Claim   Mark as Paid   Add Note

At aGlance       Amount Billed $360.00
Plan Discounts      $0.00
Your Plan Paid      $182.00
Your Responsibility $78.00
Coinsurance         $78.00

Your Responsibility  $78.00
You May Owe          $78.00
Payment Help    Make Payment

SUPPLEMENTING A MEDIA STREAM WITH ADDITIONAL INFORMATION

TECHNICAL FIELD

The present disclosure relates to data extraction and processing. In particular, the present disclosure relates to supplementing a media stream with information based on data extracted from the media stream.

BACKGROUND

Screen sharing involves displaying all or part of what is displayed on a first screen on one or more other screens. Screen sharing may include displaying user actions, such as the movement of a mouse or what is typed on the screen. Screen sharing may further involve giving control of the first screen to another device, such as by giving over control of the mouse. Screen sharing is commonly used for videoconferencing, training, and customer service applications.

A customer service agent may converse with a customer through a video-based screen sharing application. During such a conversation, a customer may present views of his screen that contain information that is useful for resolving the customer's request. The customer service agent may switch her attention away from the desktop sharing application to search for online tools that would use information obtained from reading the screen for purposes such as research or recording.

Text recognition (also known as text extraction or Optical Character Recognition (OCR)) is the conversion of typed or handwritten characters to machine-encoded text. Text recognition is commonly used to process scanned documents, or to make a document searchable by a computer. There are several methods of text recognition, such as pixel-based, density-based, and fixed-position text extraction.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4A illustrates an example source application user interface in accordance with one or more embodiments;

FIG. 4C illustrates an example target application user interface in accordance with one or more embodiments;

DETAILED DESCRIPTION

Figure 1:
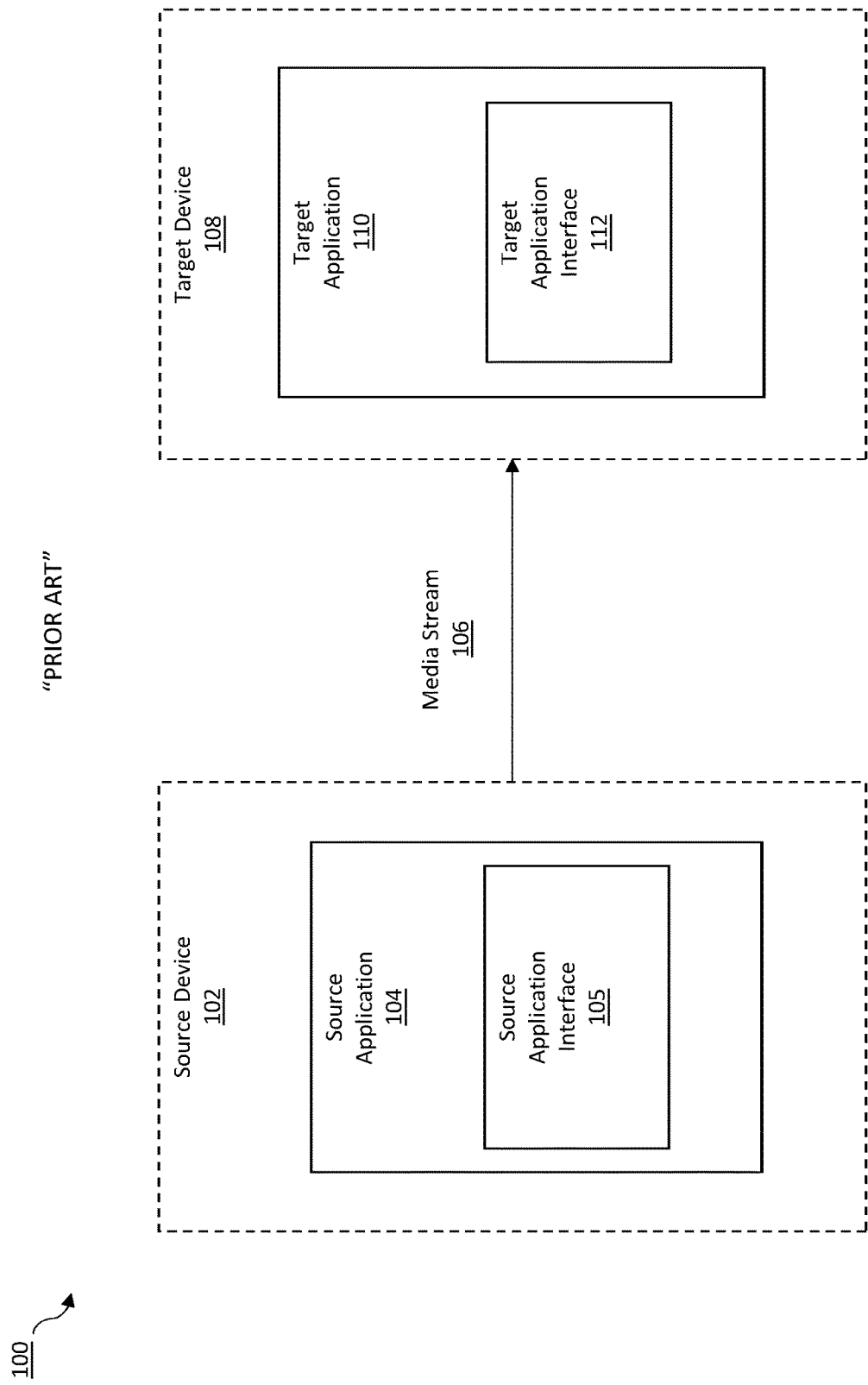
FIG. 1 illustrates a media stream from a source device to a target device in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INFORMATION SUPPLEMENTING SYSTEM
3. EXTRACTING AND PRESENTING DATA
   A. OPERATIONS FOR EXTRACTING AND PRESENTING DATA
   B. USE OF GESTURES
   C. POPULATING DATA FIELDS
   D. POLICY-BASED DATA PRESENTATION OR STORAGE
   E. EVALUATING AGENT PERFORMANCE
4. EXAMPLE EMBODIMENT—CUSTOMER AND AGENT SCREEN SHARE
5. MISCELLANEOUS; EXTENSIONS
6. HARDWARE OVERVIEW

1. General Overview

One or more embodiments include extracting and presenting data associated with a media stream being transmitted from a source device to a target device. The media stream may include a stream of video frames displayed by the source device. A screen sharing application, executing on the source device, may capture the stream of video frames. The screen sharing application may transmit the stream of video frames to a target application executing on a target device. Alternatively, or additionally, the media stream may include a stream of audio frames being transmitted from the source device to the target device. The target device (or an intermediate device) analyzes the media stream, as the media stream is received from the source device. The target device may execute pattern matching to extract information, including text, images, and audio clips from the media stream. The target device may present the extracted information or use the extracted information to perform tasks, such as filling in a form. The extracted information may be presented by the target device in real-time concurrently with the media stream.

One or more embodiments include selecting data, from a media stream, for extraction or presentation based on user gestures. During a screen share session, a user of either the source device or the target device, may gesture in relation to a subset of the screen share content. As an example, a user may point to a portion of the screen share content using a mouse pointer. As another example, a user may circle a portion of the screen share content by touching a touch screen interface with a finger. The system may analyze the gestures to identify the content being referenced by the gestures. Responsive to identifying content referenced by the gestures, the system may select the content for extraction from the media stream or for presentation to a user. The system may select the content for storing in association with the media stream.

One or more embodiments described in this Specification and/or recited in the claims may not be included in this General Overview section.

2. Information Supplementing System

FIG. 1 illustrates a media streaming system 100 in accordance with one or more embodiments. The media streaming system 100 transmits a media stream 106 from a source device 102 to a target device 108. In one or more embodiments, the media streaming system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the media stream 106 is a stream of data being transmitted from the source device 102 to the target device 108. The data may include video, images, audio, and/or text. The media stream 106 may include frames displayed on the source device 102. For example, the source device may be operated by a customer. The customer is interfacing with a customer service agent who is operating the target device. Frames displayed on the source device are transmitted to and displayed on the target device. The frames are displayed on the target device to aid the customer service agent in assisting the customer. As another example, a source device user shares a video, captured by the source device, with a target device user. A user, of the source device, may share a live video stream through video sharing application.

In one or more embodiments, the source device 102 is a device on which a media stream is created and/or managed. The source device 102 may be any device capable of creating and/or managing a media stream, such as a computer, a smartphone, or a tablet. The source device 102 includes functionality to transmit the media stream. The source device 102 may transmit the media stream 106 to a server. The server may transmit the media stream 106 to the target device 108. Alternatively, the source device 102 may transmit the media stream 106 directly to the target device 108.

In an embodiment, the source device 102 executes a source application 104. The source application 104 is an application that generates content comprising a media stream 106. The source application 104 may capture frames, displayed by the source device 102, as a media stream. As an example, a customer may navigate to a website using a web browsing application. The customer may further interact with the website content by, for example, executing searches on the website. The source application 104 may capture a video stream including the video frames corresponding to the user's interaction with the website content.

The source application 104 may receive a media stream captured by an external screen capture application different than the source application 104. The source application 104 or the external screen capture application may capture video frames, screenshots, and/or gestures to create a media stream. Alternatively, or additionally, the source application 104 may record a video and transmit a media stream comprising the video.

In one or more embodiments, a source application interface 105 is a user interface which displays information and accepts input. The source application interface 105 may be implemented by the source application 104 as illustrated in FIG. 1. Alternatively, or additionally, the source application interface 105, illustrated within source application 104, may instead be implemented by a separate application different than the source application 104.

The source application interface 105 may include a Graphical User Interface (GUI). The GUI may include buttons, fields, check boxes, drop down menus, and other graphical components. A user may interact with the graphical components of the GUI to obtain information or provide input. The user interaction with the source application interface 105 may include gestures. As an example, a user may point to or highlight an element of the GUI via the source application interface 105. If the source device is a touch screen device, the user may touch the touch screen device to provide input via the source application interface. As an example, the source application interface may display a set of records. The user may circle a display of the particular record with a finger. The interaction between the user and the source application interface 105, including the gestures, may be captured as the media stream 106.

In one or more embodiments, the target device 108 is a device configured for receiving and displaying the media stream 106. The target device 108 may be any device capable of receiving and displaying the media stream, such as a computer, a smartphone, or a tablet. The target device 108 includes a target application 110.

In one or more embodiments, the target application 110 is an application for presenting the media stream 106. The target application may receive a media stream and display the media stream to a target application interface 112. For example, the target application 110 may present a media stream 106 comprising video and audio, as the media stream 106 is received.

In one or more embodiments, the target application interface 112 is a user interface which displays information. In particular, the target application interface 112 displays the media stream 106. The target application interface 112 may be implemented by the target application 110 as illustrated in FIG. 1. Alternatively, or additionally, the target application interface 112, illustrated within target application 110, may instead be implemented by a separate application different than the target application 110.

Figure 2:
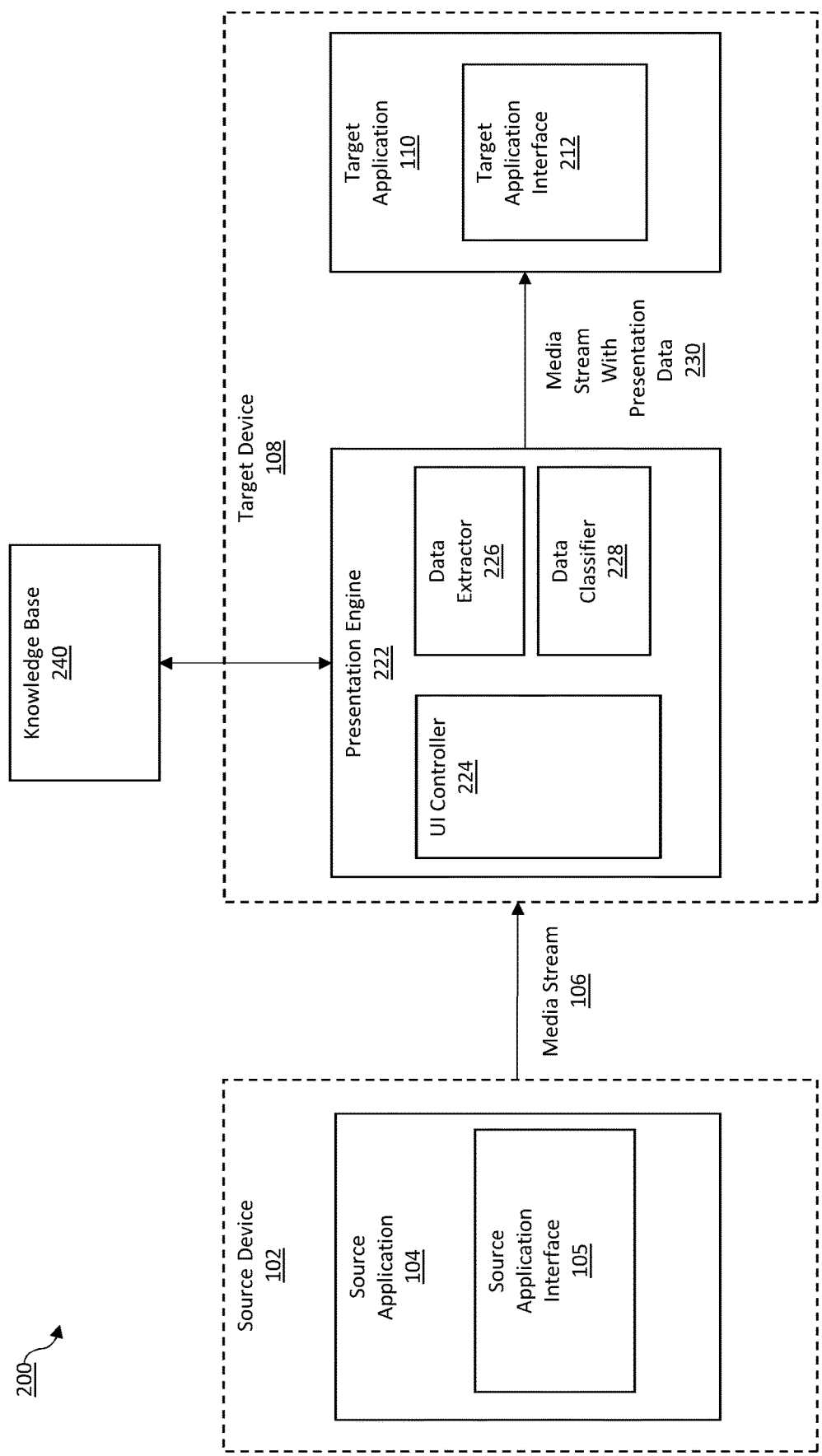
FIG. 2 illustrates a system for extracting and presenting data in accordance with one or more embodiments.

FIG. 2 illustrates a system 200 for extracting and presenting data from a media stream in accordance with one or more embodiments. The system 200 includes a source device 102, source application 104, a target device 108, and a target application 110, as described above with respect to FIG. 1. The system furthers include a presentation engine 222 and a knowledge base 240. In one or more embodiments, the system 200 may include more or fewer components than the components illustrated in FIG. 2. The components illustrated in FIG. 2 may be local to or remote from each other. The components illustrated in FIG. 2 may be implemented in software and/or hardware. Each component may be distributed over multiple applications and/or machines. Multiple components may be combined into one application and/or machine. Operations described with respect to one component may instead be performed by another component.

In one or more embodiments, the presentation engine 222 includes hardware and/or software configured to generate presentation data. Presentation data includes data that may be displayed with the media stream by the target application 110 executing on the target device 108. The presentation data may be generated based at least in part on the media stream 106, as described below.

The presentation engine 222 may execute independently of the target application 110 or as a component of the target application 110. The presentation engine 222 may be a native application of the target device 108. Alternatively, the presentation engine 222 may be an application executing on a server separate from the target device. The presentation engine 222 may utilize a UI controller 224, a data extractor 226, and a data classifier 228, illustrated as components of the presentation engine 222. One or more of the components may be implemented as external components in communication with the presentation engine 222.

The presentation engine 222 may be implemented as an intermediate entity between the source application 104 and the target application 110, as illustrated in FIG. 2. When implemented as an intermediate entity, the presentation engine 222 receives the media stream 106 from the source application 104 and forwards at least a portion of the media stream 106 to the target application. In addition, the presentation engine 222 may determine and transmit additional information associated with the media stream to the target application 110. Accordingly, the target application may receive both the presentation data and the media stream from the presentation engine 222.

The presentation engine 222 may be implemented out-of-band (not illustrated) instead of in-band as an intermediate component between the source application 104 and the target application 110. When the presentation engine 222 is implemented out-of-band, both the presentation engine 222 and the target application 110 receive the media stream 106 from the source application 104. The presentation engine 222 may determine and transmit presentation data to the target application 110. Accordingly, the target application 110 may receive (a) the presentation data from the presentation engine 222 and (b) the media stream from the source application 102 without traversal through the presentation engine 222.

In an embodiment, the data extractor 226 includes software and/or hardware for extracting data from the media stream 106. The data extractor 226 may analyze an image (such as a frame from a video) using a text or image recognition technique. The data extractor 226 may extract text, audio, and/or still images from a media stream. The data extractor 226 may analyze metadata associated with the media stream to extract information such as location or Internet Protocol (IP) address.

In an embodiment, the data classifier 228 includes software and/or hardware to classify data extracted by the data extractor 226. The data classifier 228 may determine a data type of the data extracted from a media stream. For example, the data classifier 228 may classify a set of numbers as a social security number based on a display format of the extracted number (e.g., XXX-XX-XXXX). The data classifier 228 may classify extracted data based on metadata associated with an extraction context. As an example, the data classifier 228 may obtain metadata for a banking website. The metadata identifies the x and y coordinates of a webpage, of the banking website, which corresponds to a bank account number. When the data classifier 228 obtains text extracted from the x and y coordinates of the webpage, the data classifier 228 determines, based on the metadata, that the text corresponds to a bank account number. The data classifier 228 stores the text as a value for a bank account number field.

In an embodiment, the knowledge base 240 (also referred to herein as a "database") includes one or more systems for data management and/or troubleshooting. The knowledge base 240 may include multiple data repositories associated with respective companies or tasks. As an example, the knowledge base 240 may include data for an insurance company. Specifically, the knowledge base 240 may include a customer management system storing customer data. The knowledge base 240 may further include an underwriter system storing policy data.

The knowledge base 240 may be communicatively coupled to the presentation engine 222. The presentation engine 222 may transmit information and/or requests to the knowledge base 240, and receive information from the knowledge base 240. Alternatively, or additionally, the knowledge base may be a database of information local to the presentation engine 222.

In an embodiment, the UI controller 224 includes functionality to the generate presentation data. The presentation data may include data extracted by the data extractor 226, or additional data obtained from the knowledge base 240 based on extracted data. The UI controller 224 may submit queries to the knowledge base 240. The UI controller may receive information, responsive to submitting a query to the knowledge base 240. The UI controller 225 may summarize and/or process the received data prior to inclusion in the presentation data. As an example, the UI controller queries the knowledge base to receive all available information associated with a reservation number. The UI controller selects a subset of the received information as presentation data to be transmitted to the target application 110.

The UI controller may modify the media stream 106, received from the source application 104, to include the presentation data. For example, the UI controller may modify the media stream to overlay text over media, so that words appear over a video. Alternatively, or additionally, the UI controller may transmit the presentation data to the target application 110 for a display of the presentation data adjacent to the media stream 106. As an example, the target application interface 212 may display a text box, including the presentation data, adjacent to the media stream 106.

In an embodiment, the media stream with the presentation data 230 is transmitted from the presentation engine 222 to the target application 110. The media stream and the presentation data may be transmitted in a single overlaid stream. Alternatively, or additionally, the media stream and the presentation data may be transmitted in separate streams. The media stream and the presentation data may be transmitted concurrently or asynchronously.

In an embodiment, the target application interface 212 includes the capabilities of the target application interface 112 in FIG. 1. Additionally, the target application interface 212 includes functionality to display presentation data, in conjunction with the media stream. The target application interface may display text in a pop-up window, overlay text over a media stream, or present text in a text box adjacent to a media stream.

3. Extracting and Presenting Data

A. Operations for Extracting and Presenting Data

FIGS. 3A-3D illustrate example sets of operations for extracting and presenting data, in accordance with one or more embodiments. One or more operations illustrated in FIGS. 3A-3D may be modified, rearranged, or omitted altogether. Accordingly, the particular sequence of operations illustrated in FIGS. 3A-3D should not be construed as limiting the scope of one or more embodiments.

Figure 3A:
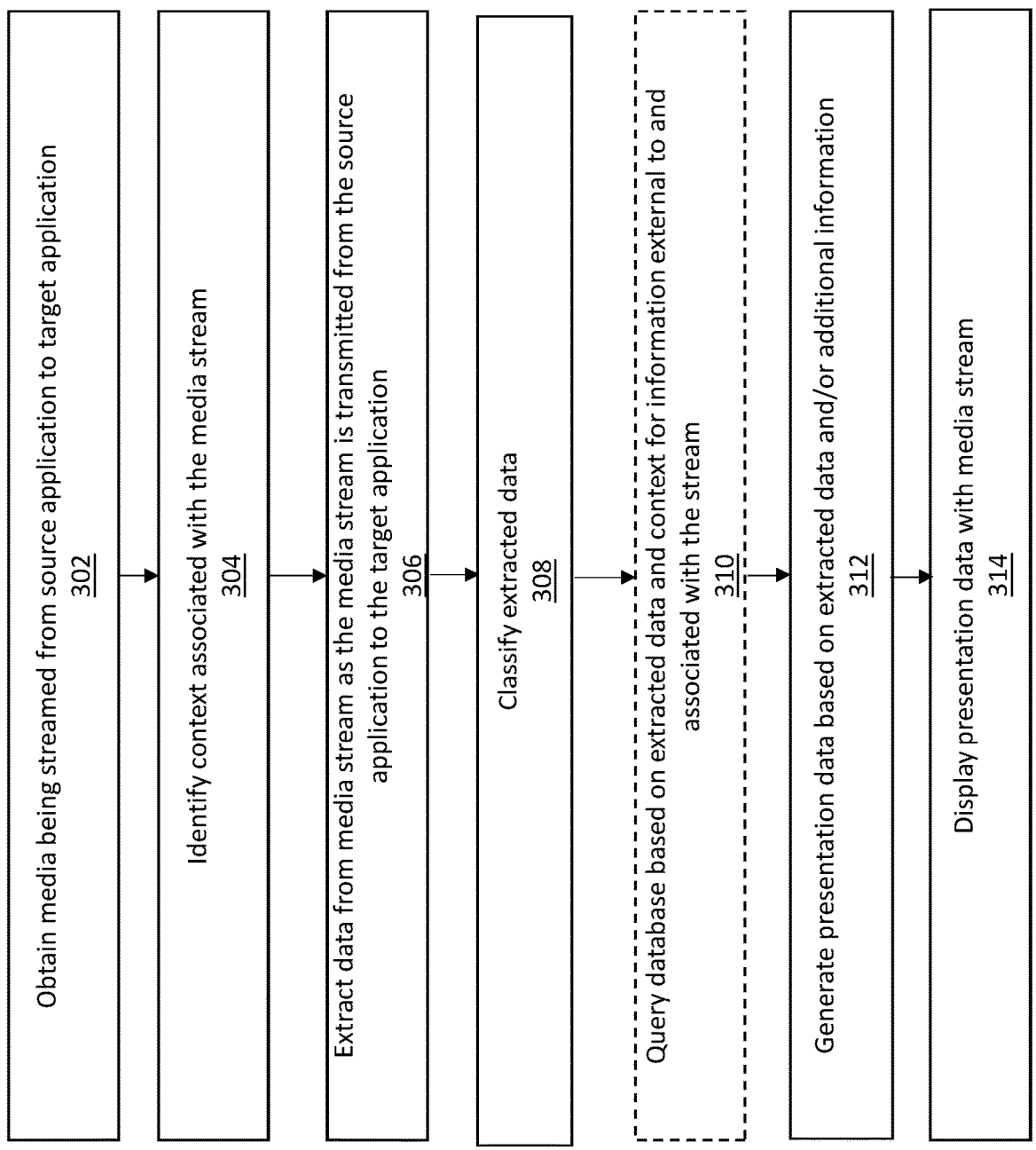
FIG. 3A illustrates an example set of operations for extracting and presenting data in accordance with one or more embodiments.

Referring now to FIG. 3A, in an embodiment, the presentation engine obtains media being streamed from the source application to the target application (Operation 302). As described above, the media stream may correspond to a stream of media frames presented by the source application. The presentation engine may receive a copy of the media stream as the media stream is transmitted to the target application, without affecting the transmission of the media stream to the target application. Alternatively, the presentation engine may obtain the media stream from the source application, and transmit at least a portion of the media stream to the target application.

In an embodiment, the UI controller identifies the context associated with the media stream (Operation 304). Specifically, the UI controller may identify the context that is to be used by the data classifier to classify data extracted from the media stream. The UI controller may determine the context associated with the media stream based on text or images within the media stream itself.

The UI controller may determine a software environment or application associated with a media stream. As an example, the media stream may include a screen share of a user's interaction with an application. The UI controller may determine that the media stream includes frames with a logo for a Bank Big M. Based on the detection of the logo for the Bank Big M, the UI controller determines that the media stream includes a display of a web interface for Big M's customers. The UI controller may further identify the particular web page, from the web interface for Big M's customers, being displayed in each video frame.

The UI controller may determine physical environment information associated with a media stream. As an example, the UI controller may identify a location associated with the media stream. As an example, the media stream may include a user Bob's home-made video during a visit to the Great Wall of China. The UI controller may execute an image search based on the video frames within the media stream. Based on the image search, the UI controller may determine that the media stream includes a video of the Great Wall of China.

The UI controller may determine context based on metadata associated with the media stream. For example, the media stream includes video of a user interacting with a webpage. Metadata received with the media stream identifies the Uniform Resource Locator (URL) of the webpage. The UI controller uses the URL of the webpage to determine that the media stream is associated with a client application corresponding to a particular online marketplace, Amaze.

The UI controller may determine context based on a stored template associated with media stream. As an example, the media stream determines that the media stream relates to a particular online banking interface. The UI controller identifies a stored template corresponding to the online banking interface. The stored template identifies the context for each portion of the particular online banking interface. The stored template may identify, for example, an x and y location of an account number within the particular online banking interface. The stored template may identify frames corresponding to customer information and frames corresponding to advertisements that can be ignored by the system.

In an embodiment, the data extractor extracts data from media as the media is streamed (Operation 306). The data extractor may extract text data from the media stream using techniques such as pixel-based, density-based, or fixed-position text extraction. The data extractor may use stored templates, identified by the UI controller, to select data to capture. As an example, the media stream includes a screen share of a user navigating a website. A template for a particular web page, of the website, indicates that there is an insurance claim number on the web page. The insurance claim number spans vertically from pixels 100-500, with a 100-pixel horizontal width beginning a horizontal pixel position 0. The data extractor uses fixed position extraction to extract the insurance claim number in the specified portion of a frame of the media stream. The data extractor may continually extract text data from a series of frames, in real time, corresponding to a user's navigation of the website.

Alternatively, or additionally, the data extractor may extract image data and/or audio data from the media stream. The data extractor may use an image recognition technique (e.g., face recognition) to extract a subset of images from a series of video frames. The data extractor may use an audio recognition technique to extract audio data from the media stream. As an example, the data extractor uses a music recognition technique to extract a song from the media stream. As another example, the data extractor uses a speech recognition technique to extract a set of words spoken by a customer, using the source device, while explaining a problem.

In an embodiment, the data classifier classifies the extracted data (Operation 308). Classifying data may include determining that the data corresponds to a particular field, attribute, or set of information. As an example, the classifier may determine that a set of extracted numbers corresponds to a bank account number. The data classifier may classify an image as corresponding to a particular location.

In an embodiment, the data classifier classifies data based on the context associated with the media stream. As an example, the UI controller determines that a media stream is a home-made video of a user at the Great Wall of China. The data classifier may use the context, the Great Wall of China to classify images within the video frames of the media stream. The data classifier may compare images to the known images of different portions of the Great Wall of China. Based on the comparison, the data classifier may classify an image as corresponding to a particular portion of the Great Wall of China.

As another example, the data classifier may classify data based on metadata associated with the media stream. As an example, a template specifies that an insurance claim number is located at particular x and y pixel coordinates on a particular webpage. The data classifier determines that the number 5879766 is located at the particular x and y pixel coordinates on the particular webpage. Accordingly, the data classifier classifies 5879766 as an insurance claim number.

The system may convert some or all of the extracted text to a vector. For example, the system may extract text from a screen of a food-ordering application, classify the text, and input the relevant data into the following data vector:

<Customer, John Smith><Restaurant, Joe's Pizza><Order number, 675479>.

In an embodiment, the UI controller queries a database, based on at least a portion of the extracted data and/or context, for information external to and associated with the media stream (Operation 310). The UI controller may execute a query on the database using text extracted from the media stream to obtain the external information associated with the media stream. As an example, a customer and an agent are discussing a problem with a product purchase made by the customer. The customer's screen is shared with the agent via a screen sharing application. The customer's screen displays an order number, but does not display details about the customer's purchase. The screen share is captured in a media stream that is transmitted to the presentation engine. The order number is extracted from the media stream. The UI controller uses the order number to execute a search in an external database for details about the customer's order. The UI controller retrieves the details, including an estimated shipment date for the product corresponding to the customer's order.

The UI controller may select a portion of the data, extracted from the media stream, for executing database queries. The UI controller may select the portion of the data, for executing database queries, based on the context or metadata associated with the media stream. The UI controller may select the portion of the data based on gestures, as described below with reference to FIG. 3B.

In an embodiment, the presentation engine generates presentation data based on the extracted data and/or external information (Operation 312) for display with the media stream (Operation 314). The presentation engine may select some or all of the extracted text for presentation. The presentation engine may supplement extracted data with external information retrieved from a database, or display only the external information.

As an example, a customer is executing a bank's mobile application. The application is displaying a bank account statement, on the customer's screen, which includes multiple transactions. A bank agent receives a media stream including the customer's interaction with the application. The presentation engine identifies each of multiple transactions based on text extracted from the media stream. The customer asks the bank agent about one particular transaction by verbally referencing the particular date on which the particular transaction was executed. The system analyzes the media stream to detect the date verbally referenced by the customer. The system identifies the particular transaction, from the multiple transactions being displayed on the customer's screen, based on the date referenced by the customer. Presentation data relating to the particular transaction is determined and selected for presentation to the bank agent. The presentation data may include, for example, the transaction date (displayed on the customer's screen), a vendor associated with the particular transaction (displayed on the customer's screen), and a phone number of the vendor associated with the particular transaction (obtained by a querying a database).

As an example, the system is transmitting a video of a vacation in San Francisco. The presentation engine selects the text, "Fisherman's Wharf," extracted from a still of the video, for presentation with the video. The presentation engine also selects a paragraph describing Fisherman's Wharf for presentation adjacent to the video. The paragraph describing Fisherman's Wharf is obtained by querying a database for a description of Fisherman's Wharf.

The presentation engine may determine the presentation data based on an ordered sequence of interfaces in the media stream. The order in which a series of screens appear in a media stream may have significance in determining the presentation data. For example, a user of the source application is experiencing an error as he attempts to play a video game. The media stream comprises video of the user playing the video game, an error screen, and video of the source application restarting. The presentation engine determines that the error screen, including the code "7899989079," follows immediately after the video game showed a character jumping off a cliff. The presentation engine selects presentation data associating the character jumping off the cliff in the game with the error associated with the extracted error code.

The presentation engine may transmit the media stream with presentation data to the target application for presentation. Alternatively, or additionally, the presentation engine may display the media stream with presentation data. The presentation engine may store, or transmit for storage, some or all of the media stream with presentation data.

In an embodiment, the target application (and/or presentation engine) presents the media stream with the presentation data. The target application may display presentation data over the media stream (for example, as captioned text). As an example, the target application displays a series of screens viewed by a customer. The target application displays text, overlaid on the screens, comprising troubleshooting information for a customer service agent. Alternatively, or additionally, the target application may present the presentation data alongside the media stream. For example, the target application may present a series of screens as viewed by the customer, while displaying information useful to the customer service agent in a sidebar.

The system may cause display of the presentation data on the target device by transmitting the presentation data to the target device. The presentation engine may generate presentation data and transmit the presentation data to the target device for presentation by the target device. The presentation engine may overload a media stream received from the source device with text data. Overloading the media stream generates a single stream for transmission to the target device. Alternatively, or additionally, the system may cause display of the presentation data on the target device by displaying the presentation data.

In an embodiment, if data is not extracted from the media stream, then the target application presents media without presentation data. As an example, if no pertinent data has been extracted from a media stream, the presentation engine may transmit the media stream directly to the target application, for presentation, without the addition of any presentation data.

B. Use of Gestures

Figure 3B:
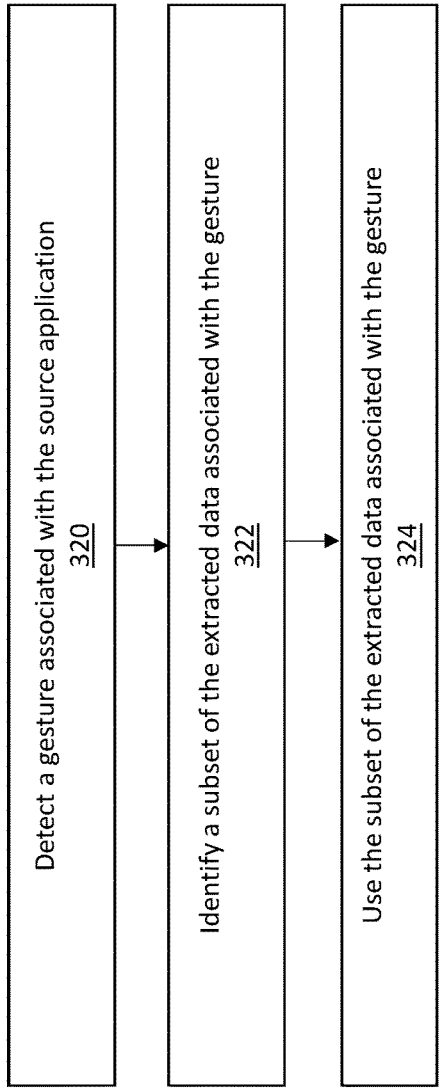
FIG. 3B illustrates an example set of operations for gesture-based data selection in accordance with one or more embodiments.

In an embodiment, the presentation engine uses a gesture associated with the source application to analyze extracted data. FIG. 3B illustrates an example set of operations for gesture-based context determination.

In an embodiment, the UI controller detects a gesture associated with the source application (Operation 320). A gesture may be, for example, the motion of a pointer directed by a mouse, a finger swipe, or a stylus swipe. A user of the source device may gesture to emphasize a subset of the screen share content. As an example, a user may use a mouse pointer to point to a word displayed by the source application. As another example, a user may swipe a touch screen interface with a finger to indicate an association between two or more words displayed on the screen.

In an embodiment, the UI controller identifies a subset of the extracted data associated with the gesture (Operation 322). The UI controller may compare the position and/or movement of the gesture to data from a corresponding location on a frame. As an example, the UI controller determines that a user was pointing to the word "Overdue" on a webpage. The UI controller identifies the word "Overdue" as relevant to the user.

In an embodiment, the presentation engine uses the subset of the extracted data associated with the gesture (Operation 324). The presentation engine may use the subset of the extracted data associated with the gesture to determine a query to submit to the knowledge base (as in Operation 310 of FIG. 3A). As an example, a user circles the time of an appointment on a screen. The presentation engine determines that the user is interested in the appointment time. The presentation engine structures a query about the appointment time to transmit to the knowledge base. Alternatively, or additionally, the presentation engine may select the subset of the extracted data associated with the gesture for presentation. For example, upon determining that the user circled the appointment time, the presentation engine displays a popup to the source device including the text: "Customer is interested in the appointment time."

The presentation engine may determine a connection between one or more subsets of extracted data based on the user gesture. As an example, a user gestures between the date of her flight and the date of her train ride. The presentation engine determines that the corresponding query should include both the flight date and the train ride date.

C. Populating Data Fields

Figure 3C:
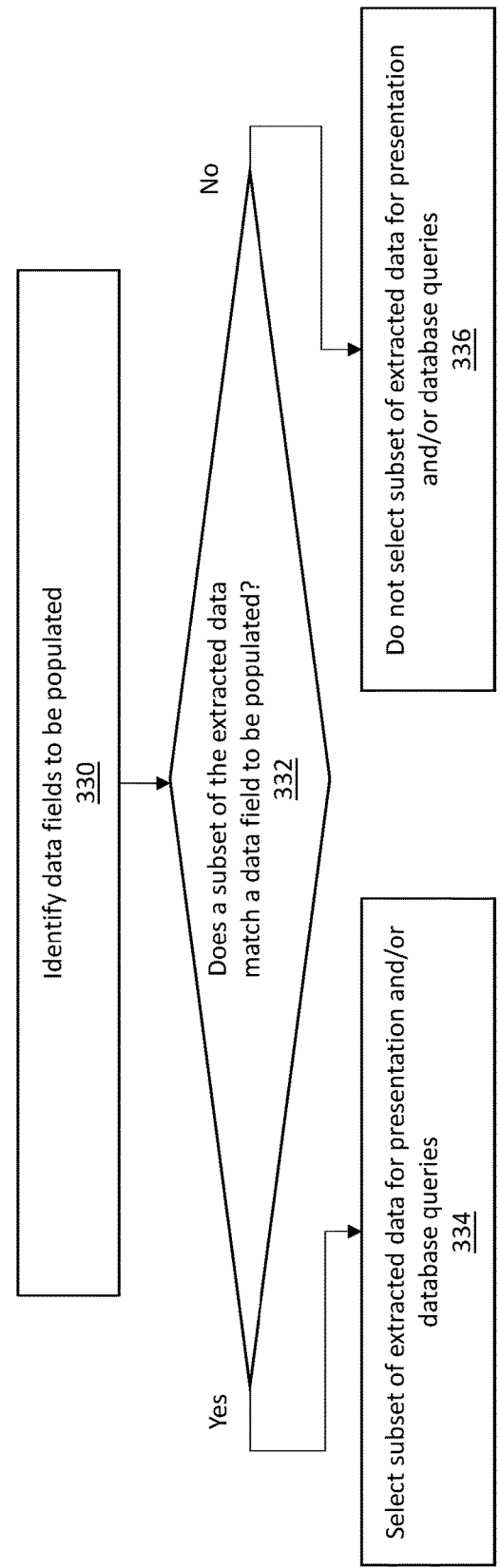
FIG. 3C illustrates an example set of operations for populating data fields in accordance with one or more embodiments.

FIG. 3C illustrates an example set of operations for populating data fields in accordance with one or more embodiments. In resolving a customer issue, a search may be submitted to an external system, or a ticket may be submitted for further investigation into a claim. A search, ticket submission, or other procedure may require a form to be filled out.

In an embodiment, the UI controller identifies data fields to be populated (Operation 330). Data fields may be presented for population by a UI visible to the agent. As an example, the UI controller generates data fields to be used in escalating an insurance claim, to display via the target application interface. Alternatively, or additionally, data fields may be presented for population directly to the UI controller, i.e., by an exposed API of a third-party application. The UI controller may query an application to retrieve available fields or a subset of available fields. For example, the UI controller may poll a claim management application for available data fields to be populated.

In an embodiment, the UI controller determines whether a subset of the extracted data matches a data field to be populated (Operation 332). The UI controller may analyze classifications associated with the extracted data to determine whether a subset of the extracted data matches a particular data field. For example, the presentation engine has generated a data vector: <Patient, John Doe><Doctor, L Skywalker><Claim Number, 1234453534>. A data field to be populated is [Claim Number: _____]. The UI controller determines that the extracted data 1234453534 matches the data field to be populated, because the classification "Claim Number" associated with the extracted data matches the data requested by the form field.

In an embodiment, if a subset of the extracted data matches a data field to be populated, then the UI controller selects the subset of the extracted data for presentation and/or database queries (Operation 334). The UI controller may select the subset of the extracted data to present via the target application while filling a user-visible form. As an example, an agent's UI displays a series of forms to be filled by the agent. The UI controller selects the subset of extracted data, to fill the forms with the subset of extracted text, while presenting the subset of extracted data to the agent via the user-visible forms. Alternatively, or additionally, the UI controller may select the subset of the extracted data for a back-end database query, without presenting the subset of the extracted data. For example, the UI controller transmits 10 selected text strings to 10 respective fields of a travel application, to submit a travel booking request.

In an embodiment, if a subset of the extracted data does not match a data field to be populated, then the UI controller does not select the subset of the extracted data for presentation and/or database queries (Operation 336). The UI controller may discard extracted data which does not match a data field to be populated. Alternatively, or additionally, the UI controller may use extracted data which does not match a data field to be populated. As an example, the UI controller may display data, which is useful to an agent but not needed for form filling. As another example, the system may store all extracted data for subsequent analysis.

D. Policy-Based Data Presentation or Storage

Figure 3D:
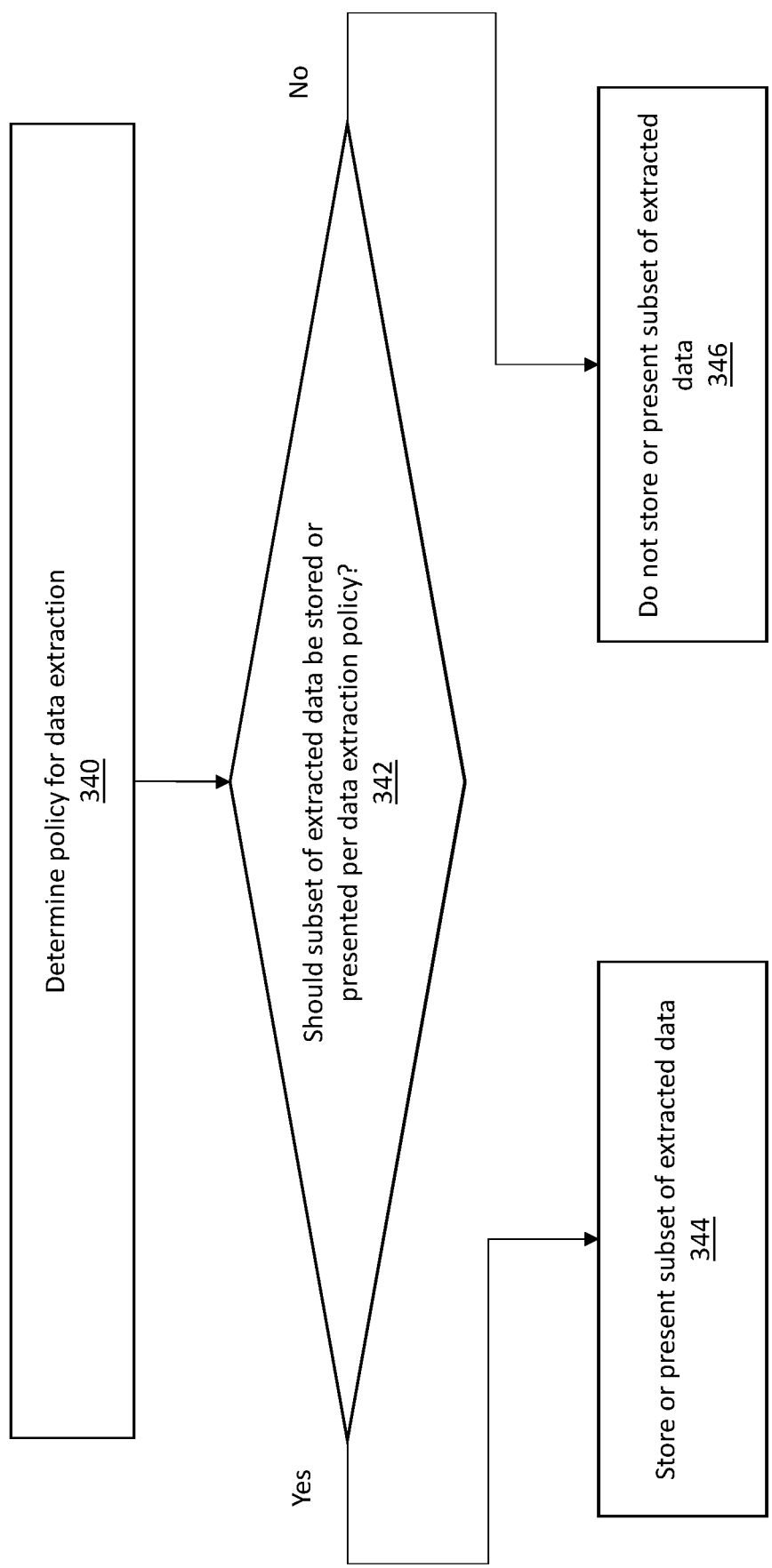
FIG. 3D illustrates an example set of operations for policy-based data selection in accordance with one or more embodiments.

FIG. 3D illustrates an example set of operations for determining a policy for data presentation or storage in accordance with one or more embodiments.

In an embodiment, the system presents and/or stores at least a subset of a media stream. As an example, the system presents and records a media stream with presentation data including a series of screens viewed by the customer. The system may store, or refrain from storing, some or all of a recorded video stream in accordance with policy. For example, some information may be unsuitable for storage. A customer service company may have a policy not to store any bank account numbers.

In an embodiment, the presentation engine determines a policy for data extraction (Operation 340). A particular system or application may have a policy in place establishing what data should be extracted, stored, or displayed. For example, a bank may have a policy that a full social security number cannot be displayed or stored. The presentation engine may query the database to retrieve a stored policy. Alternatively, or additionally, the presentation engine may determine an appropriate policy based on a default. For example, if no policy is in place, the presentation engine refrains from saving medical records marked "confidential."

In an embodiment, the presentation engine determines whether a subset of the extracted data should be stored or presented per the data extraction policy (Operation 342). The presentation engine may compare a subset of the extracted data to the data extraction policy. The presentation engine may use a classification of the extracted data and/or metadata associated with the extracted data to execute the comparison. For example, the number 456789012 is classified as a social security number. A policy in place prohibits the storage of social security numbers. Based on the classification, the presentation engine determines that the number should not be stored, per the data extraction policy.

In an embodiment, if a subset of the extracted data should be stored or presented per the data extraction policy, then the presentation engine stores or presents the subset of the extracted data (Operation 344). The presentation engine may store or present the subset of the extracted data based on a policy specifying that the type of extracted data at issue should be stored. Alternatively, or additionally, the presentation engine may store or present the subset of the extracted data, unless the data extraction policy specifically forbids the storage or presentation of that type of data.

In an embodiment, if a subset of the extracted data should not be stored or presented per the data extraction policy, then the presentation engine does not store or present the subset of the extracted data (Operation 346). The presentation engine may refrain from storing a subset of the extracted data as restricted by policy. The presentation engine may omit a subset of the extracted data from data selected for presentation. The presentation engine may not select the subset of the extracted data for presentation. For example, the presentation engine selects all extracted words, except a customer name. The presentation engine may censor portions of the presentation data in accordance with a data storage policy, prior to storing and/or presenting a video stream. For example, a social security number is selected for presentation. The first five digits of the social security number are redacted before the video stream is stored, in accordance with policy.

E. Evaluating Agent Performance

In an embodiment, the system evaluates agent performance by analyzing the presentation data.

In an embodiment, the system displays a media stream comprising a customer's screen, with presentation data, to an agent. The agent is helping the customer to solve a problem. The agent directs the customer to navigate through a series of screens to resolve the problem.

In an embodiment, the system measures the performance of the agent. The system may measure the performance of the agent based on a time taken to solve the problem. For example, an agent is helping a customer to solve a problem on an online retailer webpage. The system monitors the time that the media stream and presentation data was transmitted to the agent, 5 minutes. The system determines that 5 minutes is below the average time spent solving a problem on the online retailer webpage. The system determines that the agent performance was satisfactory.

Alternatively, or additionally, the system may measure agent performance based on a number of screens navigated through to solve a problem. For example, at the agent's direction, the customer navigated through 7 screens. The system determines that the agent performance was inadequate, because the particular problem can be solved by navigating through 2 screens.

4. Example Embodiment—Customer and Agent Screen Share

In an embodiment, a customer is sharing his screen with a customer service agent, to address an issue with an insurance claim. The screen share is transmitted as a media stream. The system extracts and presents data from the media stream, to help the agent to resolve the issue efficiently.

FIG. 4A illustrates an example source application user interface in accordance with one or more embodiments. The screen 402 depicted in FIG. 4A shows the interface displayed to the customer via a medical insurance web application. Frames, as displayed on the source application user interface, are transmitted, as a media stream, to the agent. The data extractor extracts data, in real time, as the media stream is transmitted to the agent.

Figure 4B:
FIG. 4B illustrates an example template image in accordance with one or more embodiments.

FIG. 4B illustrates an example template image 410 in accordance with one or more embodiments. The data classifier uses the template image 410 to classify extracted text. The system classifies the extracted text in real time as the media stream is transmitted to the agent. Using metadata in the data stream identifying the webpage viewed, the system locates the corresponding template image 410. The data classifier classifies the extracted text data using the template image 410. The data classifier compares the captured image and the template image. In the upper right corner of each image, both images include the text "Claim for" followed by "John Doe" and "Patient" respectively. Accordingly, the data classifier determines that the patient is John Doe. Below the patient name, both images include the text "Visited," followed by "L. Skywalker" and "Doctor Name" respectively. Accordingly, the data classifier determines that the doctor name is L. Skywalker. The data classifier also classifies the claim number and the service date by comparing the two images. The data classifier returns the following vector of classified data: <Patient, John Doe><Doctor, L Skywalker><Claim number, 1234252566><Service date: Dec. 5, 2016>.

FIG. 4C illustrates an example target application interface 420 in accordance with one or more embodiments. The screen displayed to the agent includes the screen 402 seen by the customer and transmitted as a media stream. The screen 402 is updated in real time as the customer navigates through the web application. In addition to the screen 402 displayed to the customer, additional information comprising an issue summary 404 and a search widget 406 is displayed to the agent.

The target application interface displays the issue summary 404. The information in the issue summary 404 is transmitted to the target application as presentation data. The information in the issue summary was obtained when the customer established a request for assistance. The customer specified the problem from a drop-down menu. The target application interface displays the issue summary 404, as specified by the customer.

The target application interface further displays a sidebar comprising a search widget 406. The search widget 406 displays presentation data generated by the system. The search widget 406 is (a) presented to the agent but not to the customer, and (b) displayed on the screen without the need for the agent to type anything.

The search widget 406 displays information retrieved by the system from a back-office health care processing system. The health care processing system is separate from the system that the customer and agent are using to communicate. The health care processing system is accessed through a cloud subscription. The search UI widget shows the agent that the billing discrepancy identified by the customer is due to coding errors 408. The target information interface displays data retrieved from the database to the search widget, enabling the agent to inform the customer that there is an issue with invalid codes.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
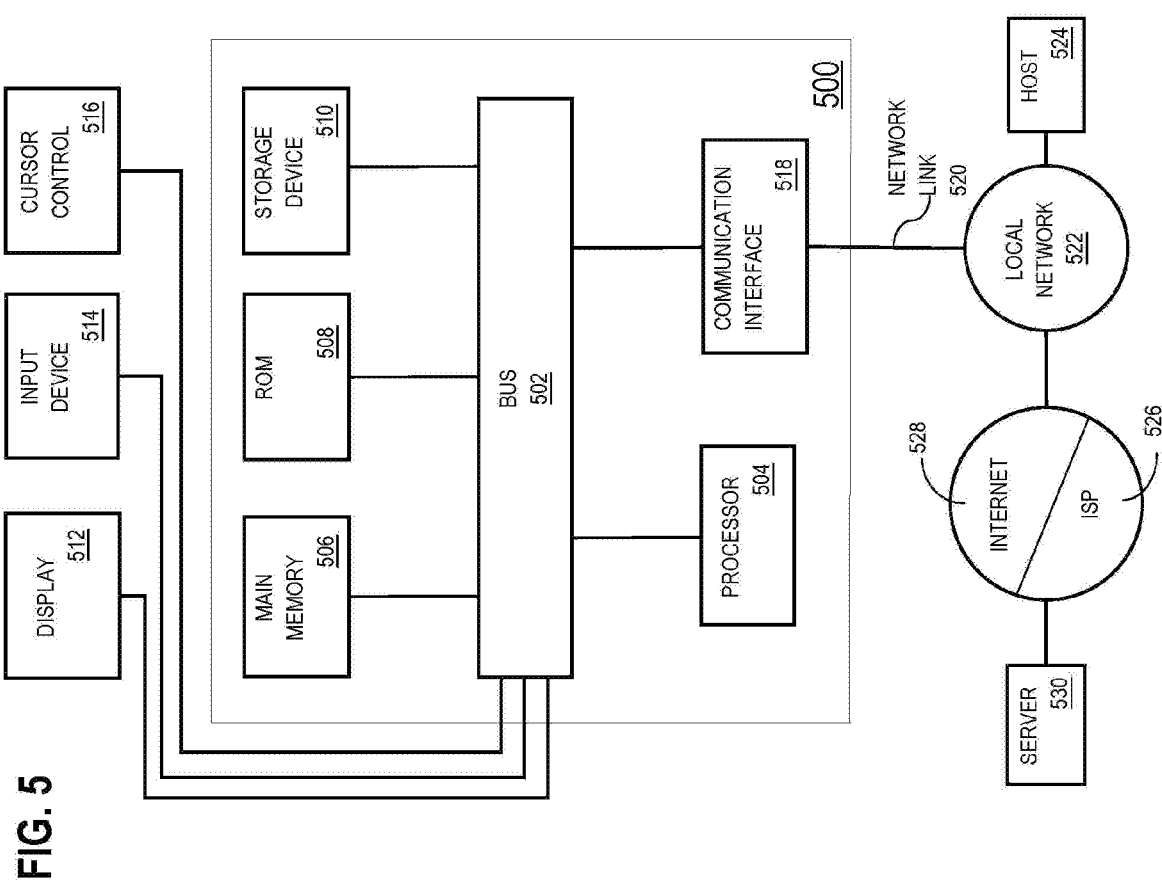
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    obtaining media being streamed, during a communication session from a source device to a target device, the media comprising a video stream;
    concurrently with the media being streamed from the source device to the target device:
    extracting text data from the media, as the media is being streamed from the source device to the target device;
    obtaining user gestures based on a user interaction, with a user interface of the source device, in relation to a portion of the media stream;
    selecting a subset, of the text data extracted from the media, corresponding to the portion of the media stream associated with the user gestures; and
    causing display of the subset of the text data as presentation data on the target device concurrently with the display of at least a portion of the media on the target device.

2. The medium of claim 1, wherein causing display of the presentation data on the target device comprises transmitting the presentation data to the target device.

3. The medium of claim 1, wherein causing display of the presentation data on the target device comprises displaying the presentation data on the target device.

4. The medium of claim 1, wherein selecting the subset of the extracted text data is further based on metadata characterizing a user application associated with the source device.

5. The medium of claim 1, wherein the operations further comprise:
    storing the extracted text data to a plurality of vectors;
    wherein the plurality of vectors is accumulated as the media is streamed; and
    generating the presentation data based on the accumulated plurality of vectors.

6. The medium of claim 1, wherein the operations further comprise:
    determining if the extracted text data is to be stored, according to a data storage policy; and
    storing the extracted text data, only if the extracted text data is to be stored according to data storage policy.

7. The medium of claim 1, wherein the operations further comprise:
    recording a sequence of operations comprising display of presentation data and actions by a user of the target device.

8. The medium of claim 7, wherein the operations further comprise censoring portions of the presentation data, in accordance with a data storage policy, prior to storing a video stream comprising the presentation data.

9. The medium of claim 1, wherein the operations further comprise:
    correlating the extracted text data with an identifier;
    querying a database based on the identifier to obtain additional information;
        causing display of the additional information on the target device concurrently with causing display of the presentation data.

10. The medium of claim 1, wherein the operations further comprise:
    determining a location of the source device;
    querying a database based at least on the location associated with of the source device to obtain additional information associated with the media;
    causing display of the additional information on the target device concurrently with causing display of the presentation data.

11. The medium of claim 1, wherein the operations further comprise:
    determining an ordered sequence of interfaces in the media; and
    determining the presentation data based on the ordered sequence of interfaces.

12. The medium of claim 1, wherein the user gestures comprise one or more of:
    a motion of a pointer directed by a mouse in relation to the portion of the media stream;
    a motion of a pointer directed by a finger swipe in relation to the portion of the media stream; or
    a motion of a pointer directed by a stylus swipe in relation to the portion of the media stream.

13. The medium of claim 1, further comprising:
    using the subset of the text data to determine a query to submit to a knowledge base.

14. The medium of claim 1, further comprising:
    using the subset of the text data to display a popup associated with the subset of the text data.

15. A non-transitory computer readable medium comprising instructions which, when executed by one or more hardware processors, causes performance of operations comprising:

obtaining media being streamed, during a communication session from a source device to a target device, the media comprising at least one of an audio stream or a video stream;

concurrently with the media being streamed from the source device to the target device:
- extracting text data from the media, as the media is being streamed from the source device to the target device;
- determining presentation data from the extracted text data; and
- causing display of the presentation data on the target device concurrently with the display of at least a portion of the media on the target device;
- displaying the presentation data to an agent, for solving a problem being presented via the media; and
- measuring a performance of the agent, based on a time taken to solve the problem.

16. A system comprising:

at least one device including a hardware processor;

the system being configured to perform operations comprising:
- obtaining media being streamed, during a communication session from a source device to a target device, the media comprising a video stream;
- concurrently with the media being streamed from the source device to the target device:
  - extracting text data from the media, as the media is being streamed from the source device to the target device;
  - obtaining user gestures based on a user interaction, with a user interface of the source device, in relation to a portion of the media stream;
  - selecting a subset, of the text data extracted from the media, corresponding to the portion of the media stream associated with the user gestures; and
  - causing display of the subset of the text data as presentation data on the target device concurrently with the display of at least a portion of the media on the target device.

17. The system of claim 16, wherein the user gestures comprise one or more of:
- a motion of a pointer directed by a mouse in relation to the portion of the media stream;
- a motion of a pointer directed by a finger swipe in relation to the portion of the media stream; or
- a motion of a pointer directed by a stylus swipe in relation to the portion of the media stream.

18. The system of claim 16, wherein causing display of the presentation data on the target device comprises one or more of: transmitting the presentation data to the target device or displaying the presentation data on the target device.

19. A method comprising:

obtaining media being streamed, during a communication session from a source device to a target device, the media comprising a video stream;

concurrently with the media being streamed from the source device to the target device:
- extracting text data from the media, as the media is being streamed from the source device to the target device;
- obtaining user gestures based on a user interaction, with a user interface of the source device, in relation to a portion of the media stream;
- selecting a subset, of the text data extracted from the media, corresponding to the portion of the media stream associated with the user gestures; and
- causing display of the subset of the text data as presentation data on the target device concurrently with the display of at least a portion of the media on the target device, wherein the method is executed by at least device including a hardware processor.

20. The system of claim 19, wherein the user gestures comprise one or more of:
- a motion of a pointer directed by a mouse in relation to the portion of the media stream;
- a motion of a pointer directed by a finger swipe in relation to the portion of the media stream; or
- a motion of a pointer directed by a stylus swipe in relation to the portion of the media stream.

* * * * *

UNITED STATES PATENT AND TRADEMARK OFFICE
CERTIFICATE OF CORRECTION

PATENT NO. : 10,558,861 B2  
APPLICATION NO. : 15/667434  
DATED : February 11, 2020  
INVENTOR(S) : Venkata Naga Ravi Page 1 of 1

It is certified that error appears in the above-identified patent and that said Letters Patent is hereby corrected as shown below:

In the Claims

In Column 20, Line 32, in Claim 19, delete "at least device" and insert -- at least one device --, therefor.

In Column 20, Line 34, in Claim 20, delete "system" and insert -- method --, therefor.

Signed and Sealed this  
Twenty-seventh Day of October, 2020

Andrei Iancu  
*Director of the United States Patent and Trademark Office*